(12) United States Patent
Ogawa et al.

(10) Patent No.: US 7,782,923 B2
(45) Date of Patent: Aug. 24, 2010

(54) WIRELESS COMMUNICATION SYSTEM AND DEVICE FOR CONTROLLING THE PEAK TO AVERAGE POWER RATIO

(75) Inventors: Daisuke Ogawa, Yokosuka (JP); Takashi Dateki, Yokosuka (JP); Hideto Furukawa, Yokohama (JP); Nobukazu Fudaba, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 1133 days.

(21) Appl. No.: 11/332,712

(22) Filed: Jan. 13, 2006

(65) Prior Publication Data

US 2006/0159159 A1 Jul. 20, 2006

(30) Foreign Application Priority Data

Jan. 14, 2005 (JP) .............................. 2005-007509

(51) Int. Cl.
*H04B 1/69* (2006.01)
(52) U.S. Cl. .................... 375/130; 375/267; 375/301; 375/260; 375/146; 375/295; 370/206; 370/343; 370/335; 370/203; 455/273; 455/66.1
(58) Field of Classification Search .............. 375/130, 375/267, 260, 326, 295, 146, 229; 370/343, 370/349, 208, 338, 503, 335, 206, 203, 209; 455/273, 66.1

See application file for complete search history.

(56) References Cited

U.S. PATENT DOCUMENTS

| | | | | | |
|---|---|---|---|---|---|
| 6,147,984 | A | * | 11/2000 | McCoy | ........................ 370/343 |
| 6,888,393 | B2 | * | 5/2005 | Naito | ......................... 327/309 |
| 7,027,464 | B1 | * | 4/2006 | Nakahara et al. | ............ 370/503 |
| 7,443,904 | B2 | * | 10/2008 | Choi et al. | ................... 375/130 |
| 2004/0008614 | A1 | * | 1/2004 | Matsuoka et al. | ........... 370/203 |
| 2004/0228267 | A1 | * | 11/2004 | Agrawal et al. | ............. 370/203 |
| 2006/0034378 | A1 | * | 2/2006 | Lindskog et al. | ............ 375/260 |
| 2007/0053280 | A1 | * | 3/2007 | Uesugi | ........................ 370/208 |
| 2007/0201572 | A1 | * | 8/2007 | Krauss et al. | ................ 375/260 |

FOREIGN PATENT DOCUMENTS

| JP | 11-205276 | 7/1999 |
|---|---|---|
| JP | 2000-106548 | 4/2000 |

* cited by examiner

*Primary Examiner*—Eva Y Puente
(74) *Attorney, Agent, or Firm*—Katten Muchin Rosenman LLP

(57) ABSTRACT

A wireless communication system, to control a peak power to an average power ratio because an amplifier characteristic of the wireless communication system include non-linear characteristic if input signal large the amplifier makes distortions. A wireless communication system comprises for suppressing a peak power to an average power ratio to process known signal like a pilot signal.

15 Claims, 12 Drawing Sheets

WIRELESS COMMUNICATION SYSTEM AND DEVICE FOR CONTROLLING THE PEAK TO AVERAGE POWER RATIO

FIELD OF THE INVENTION

The present invention relates to a wireless communication system and wireless communication device that transmits and receives known signals such as pilot signals. The wireless communication system and wireless communication device suppresses the peak to average power ratio.

BACKGROUND OF THE INVENTION

Figure 12:
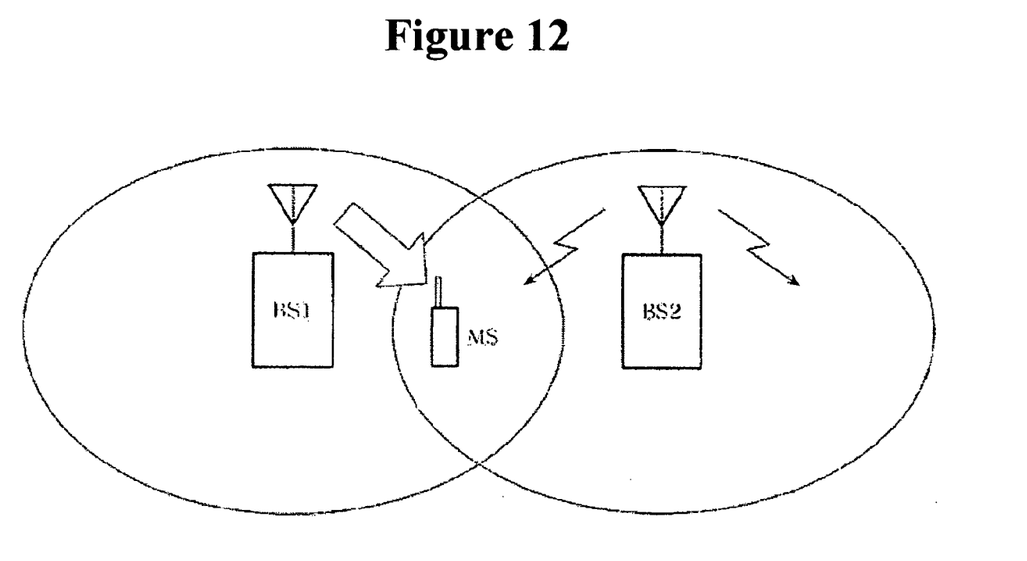
FIG. 12 is a schematic explanatory diagram of a wireless communication system useful in explaining the present invention.

Recent wireless communication systems have been utilizing code division multiplexing (CDM) and orthogonal frequency division multiplexing (OFDM). For example, FIG. 12 shows an outline of a wireless communication system arranged with multiple base stations BS1, BS2 connected to a network (the network not pictured in the drawing) and a mobile station MS. The mobile station MS communicates with the base stations BS1, BS2 with a good reception condition depending upon the mobile station MS position. A CDM system is a multiplex system which spreads a frequency utilizing different spreading codes. CDM systems tend to suffer from a problem in that if the number of the spreading codes increases the peak power becomes larger than the average power. An OFDM system is a transmission system which transmits on multiple sub-carriers related with respect to orthogonal frequency position. OFDM systems tend to suffer from a problem in that if the sub-carrier's phase timing overlap the peak power becomes larger than the average power.

The base stations BS1, BS2 and mobile station MS have a composition that includes a reception processing unit that demodulates and decodes signals received by an antenna and a transmission processing unit that transmits encoded and modulated signals from an antenna, and the transmission processing unit has a transmission amplifier that amplifies signals of wireless frequency. This transmission amplifier has an amplification characteristic which includes linear and non-linear characteristics. If an input signal amplitude is large, the transmission amplifier amplifies the input signal in a non-linear characteristic area therefore, the amplified output signal of the amplifier includes distortion.

Proposals to deal with such problems have been shown by Japanese laid open application 2000-106548 which is known prior art in CDM systems.

Moreover, Japanese laid open application H11-205276 is known prior art in OFDM systems of multiple sub-carriers.

Regarding the CDM and OFDM systems, if the transmission amplifier is built so as to amplify up to the peak power without distortion, there will be a problem of increasing cost of the amplifier.

Possible solutions to the above problems include the idea to suppress the peak and improve the peak to average power ratio (PAPR) by applying a system that provides a dummy code for peak suppression as in the above-described conventional CDM system, or a system that provides a subcarrier for peak suppression as in the OFDM system. However because a dummy code or non-information signal for PAPR suppression has a problem that the data information transmission efficiency is decreased.

SUMMARY OF THE INVENTION

The present invention, addresses the above previous problems controls the PAPR by making use of known signals or a channel that transmits known signals.

The present invention includes a wireless communication system having a multiplex unit and a transmitter. The multiplex unit multiplexes a signal by combining a processed signal with a data signal. The transmitter transmits the multiplexed signal The processed signal includes a known signal which is processed to suppress a peak power to an average power ratio.

The present invention further includes a wireless communication system having a reverse spread unit and a calculator. A reverse spread unit receives a transmitted signal which includes a known signal and a processed signal that shares a time domain a first known signal and a second known signal for suppressing a peak power to an average power ratio. The calculator calculates to compensate the second known signal in accordance with the first known signal.

DETAILED DESCRIPTION

The wireless communication system of this invention has, in a wireless communication system that performs wireless communication using multiplexed signals that include data and known signals, a transmission unit that transmits together on the time axis the known signals and signals processed for suppressing the peak to average power ratio.

If the known signals are transmitted on at least a certain frequency, then the transmission unit transmits, without temporal overlap, known signals to be transmitted on the certain frequency and signals processed so as to be able to suppress the peak to average power ratio to be transmitted on the certain frequency.

If the known signals undergo spread processing using at least a certain spread code and are transmitted, then the transmission unit transmits, without temporal overlap, known signals to be spread by the certain spread code and transmitted, and signals processed so as to be able to suppress the peak to average power ratio to be spread by the certain spread code and transmitted.

In a wireless communication system that performs wireless communication using multiplexed signals that include data and known signals, a transmission-side device divides the known signals into a first known signal and a second known signal, rotates the known signals to a phase that allows the peak to average power ratio to be suppressed and makes them into a second signal, and transmits together on the time axis the second signal and an unmodified first known signal, and a reception-side device that has a means that receives the first known signal and the second signal and, based on the first known signal, restores the second signal to the original known signal.

Also a wireless communication device of this invention transmits and receives signals in which multiple data and known signals are multiplexed, divides the known signals into a first known signal and a second known signal, makes the known signals into a second signal by processing either the phase or the amplitude or both so as to be able to suppress the peak to average power ratio based on signals by which the multiple data are multiplexed, and transmits together on the time axis the second signal and an unmodified first known signal of the known signals.

Also, it has a peak to average power ratio suppression signal calculation unit that processes and makes into the second signal either the phase or the amplitude, or both, of the known signals so as to be able to suppress the peak to average power ratio based on signals by which the multiple data are multiplexed, and a switching unit that inputs the known signals, with the unmodified first known signal, into the peak to average power ratio suppression signal calculation unit and controls the time period with the second signal.

Also, it has a control means that controls the switching unit so as to adaptively vary the time period of the combination on the time axis of the first known signal of the known signals unmodified and the second signal by which the known signals are processed by the peak to average power ratio suppression signal calculation unit.

Also, in a wireless communication device that has a channel that transmits known signals and that amplifies signals to be transmitted via the channel by an amplification unit in common with the transmission data of another channel and transmits them, it has in the channel via which the known signals are to be transmitted a control unit that controls so as to give them to the amplification unit after including signals that are not known signals.

The wireless communication system of this invention has, in a wireless communication system that performs wireless communication using multiplexed signals that include data and pilot signals or other known signals, a means that transmits together on the time axis, each in its prescribed time period, pilot signals and other known signals and signals by which are processed the phase or amplitude or both so as to be able to suppress the peak to average power ratio.

Figure 1:
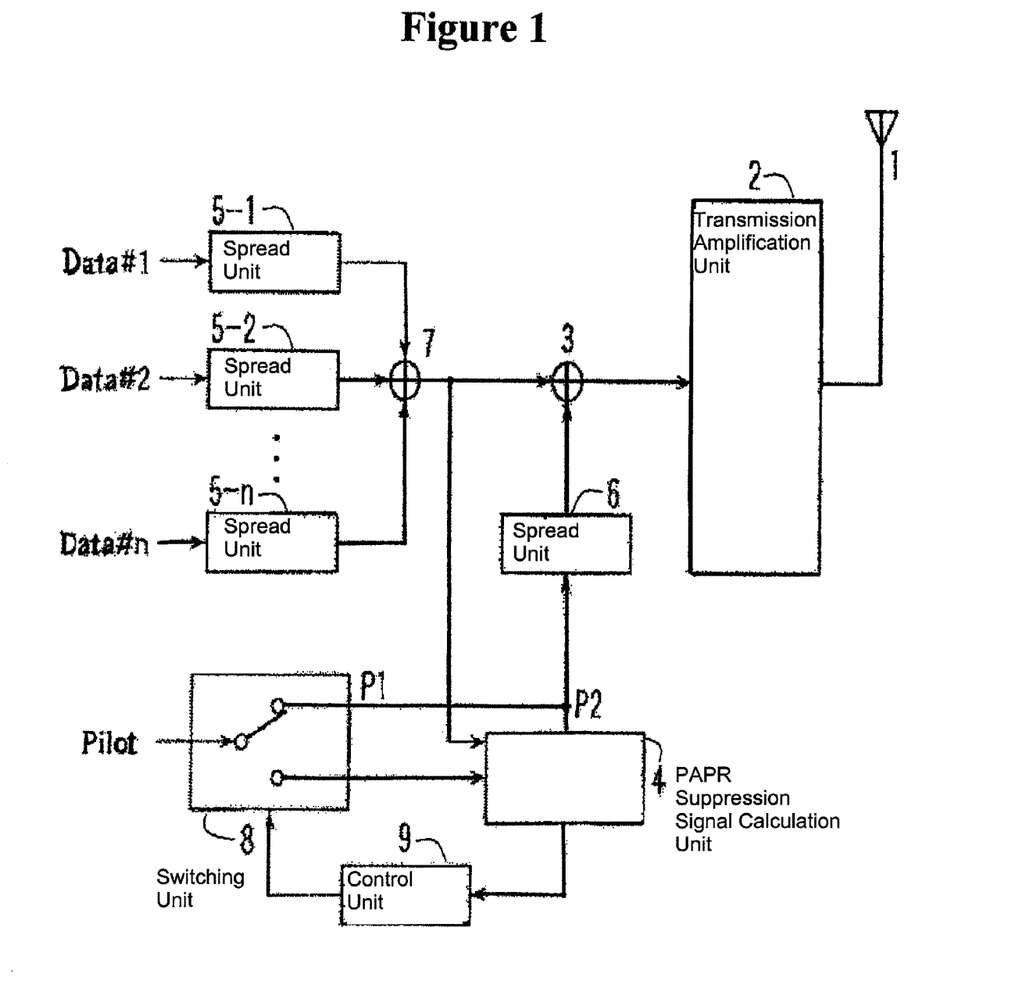
FIG. 1 is an explanatory diagram of the main parts of a first working example of this invention.

The wireless communication device of this invention has, in a wireless communication device that transmits and receives signals that multiplex multiple data and known signals, a means that divides the pilot signals and other known signals into a first known signal and a second known signal, processes phase or amplitude or both so as to be able to suppress the peak to average power ratio based on the signals that multiplex the known signals and multiple data, makes it into a second signal, combines on the time axis this second signal and the first known signal of the known signals unmodified, multiplexes them by multiplexing unit 3, amplifies them by transmission amplification unit 2, and transmits them from antenna 1.

FIG. 1 is an explanatory diagram of the main parts of the first working example of this invention. FIG. 1 may apply to the CDM system and shows the main parts of the transmission function of a wireless communication system or device.

In the diagram, 1 is an antenna, 2 is a transmission amplification unit, 3 is a multiplexing unit, 4 is a PAPR (peak to average power ratio) suppression signal calculation unit, 5-1 to 5-n and 6 are spread units, 7 is a composition unit, 8 is a switching unit, and 9 is a control unit.

Transmission amplification unit 2 also up-converts signals multiplexed by multiplexing unit 3 to a transmission wireless frequency, a transmission amplifier for amplifying and transmitting from antenna 1.

The structure of spread units 5-1 to 5-n is shown receiving a plurality of transmission data streams. The spread units 5-1 to 5-n spread the plurality of data, Data #1 to Data #n, in accordance with spread codes. The spread codes are respectively allocated data by data.

Then, the spread output signals of the spread units 5-1 to 5-n are multiplexed (combined) by composition unit 7.

Also shown in FIG. 1 is a pilot signal "Pilot" received by the switching unit 8. In this example the pilot signal "Pilot" may be considered to be a known signal.

Switching unit 8 switches over the pilot signal "Pilot" to either of the input into spread unit 6 directly (as is) or as an input into spread unit 6 via PAPR suppression signal calculation unit 4. Switching unit 8 switches over the pilot signal in accordance with a signal from a control unit 9.

As shown in the FIG. 1 example the pilot signal "Pilot" from the switching unit 8 is input directly into spread unit 6 in this case is as P1 the first known signal. The second signal P2 to be input into spread unit 6 is output from PAPR suppression signal calculation unit 4.

The PAPR suppression signal calculation unit 4 has a composition for generating the second signal P2 that is to suppress the peak power value by using a signal that undergoes multiplexing composition by composition unit 7 and the pilot signal Pilot. The output of the PAPR suppression signal calculation unit 4 is supplied to the spread unit 6.

The switching processing of switching unit 8 can be controlled by control unit 9. For example, control unit 9 the switching to a predetermined switching pattern so as to select the direct input of the signal P1 for a prescribed time period of the leading part of the slot or frame, and to the signal P2 for other time periods, etc. In another example, control unit 9 may provide control for peak suppression in accordance with calculation results yielded by PAPR suppression signal calculation unit 4. For example the PAPR suppression signal calculation unit 4 may provide input to the control unit 9.

Therefore the multiplexed signals to be input into transmission amplification unit 2 and amplified are in a peak-suppressed state and it is possible to suppress the unneeded radiation component.

Moreover, both P1 and P2 are processed by the same spread unit 6 therefore the spread code is applied the same code. In this case it should be noted that P1 and P2 are not transmitted by switching unit 8 with any temporal overlap.

Also, in spread unit 6, P1 can be transmitted with multiple spread codes, but P2 can be transmitted with one spread code among the multiple spread codes.

Also, with regard to the frequency relationships as well, P1 and P2 are both transmitted on the same frequency. And although, P1 can be transmitted with multiple frequencies, but P2 can be transmitted with one frequency among the multiple frequencies.

In the CDM system or the OFDM system, the processed pilot signal "pilot" which is a known pattern or signal is transmitted. For data reception processing, the receiver can correlate transmission paths because the receiver can obtain radio transmission path status information from the received and divided pilot signal.

By using a known signal for example pilot signal this invention does not need a channel etc, to transmit a special signal for suppressing PAPR.

The receiver divides the second signal P2 from the received signal to use the first known signal, for example pilot signal etc. And also, the receiver corrects the phase and amplitude of the second signal P2 so as to correct all pilot signal 1 is known signal, therefore the receiver is able to correct propagation path correction, etc.

Figure 2:
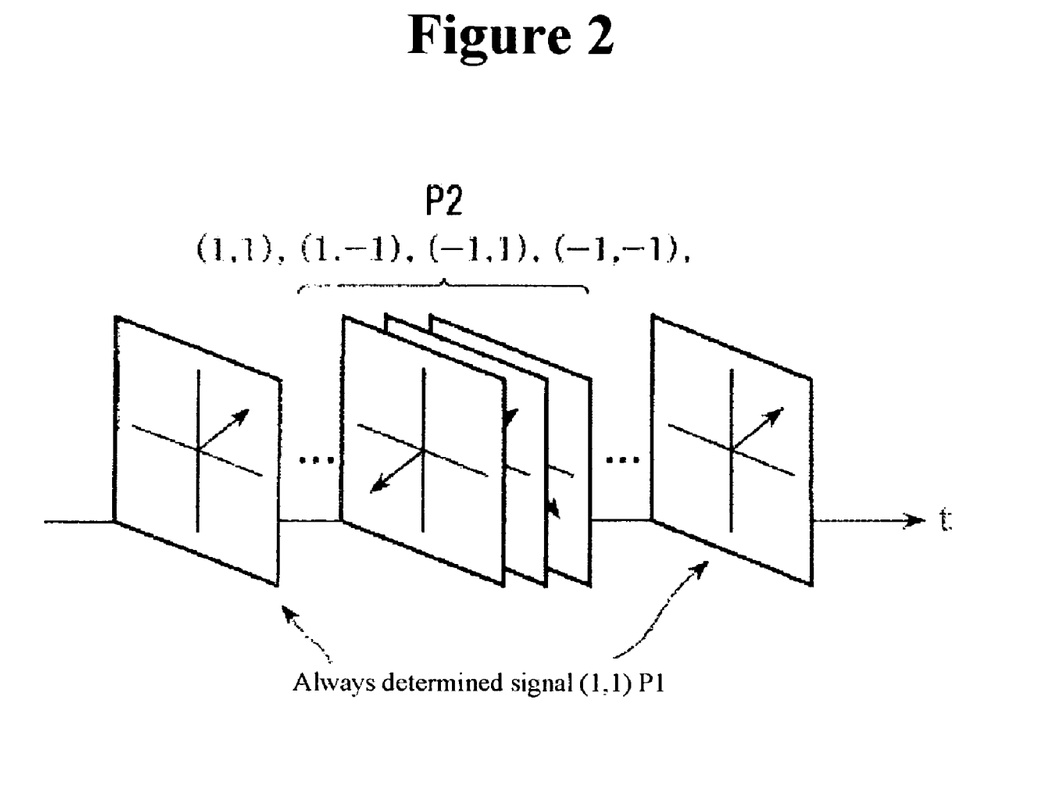
FIG. 2 is an explanatory diagram of first and second pilot signals on the transmission side.

FIG. 2 is an explanatory diagram of an example of a first pilot signal P1 and a second pilot signal P2 as the known signals referred to above;

Assuming the modulation system for the case in which a pilot signal is to be transmitted by QPSK modulation.

If the known pilot signal is signal point (1,1), then conventionally a pilot signal is transmitted as this signal point (1,1) multiplexed together with the data, etc.

But in this working example, a first pilot signal P1 is transmitted in every prescribed time period for the pilot signal which is the known signal point (1,1).

In order to make it possible for PAPR suppression to be done by PAPR suppression signal calculation unit 4, after this first pilot signal P1 is transmitted, one of the four signal points (1,1), (1,−1), (−1,1), (−1,−1) is selected and processed; that is, it is transmitted as second pilot signal P2 in a phase-controlled state.

Moreover, a single or plural of the first pilot signal P1 is always transmitted every prescribed time period, and during this first pilot signal P1, second pilot signal P2 is transmitted multiplexed onto the time axis (here too, without temporal overlap).

The time interval for first pilot signal P1 should be selected so as to allow the phase change due to the wireless propagation path during this period to be ignored to some extent.

On the receiver side, the phase of second pilot signal P2 can be corrected by taking the phase of first pilot signal P1 as a reference, making possible restoration to pilot signals of a known phase relationship.

Therefore correction processing can be done on the received data by a reception-side propagation path correction means using the pilot signal.

Figure 3:
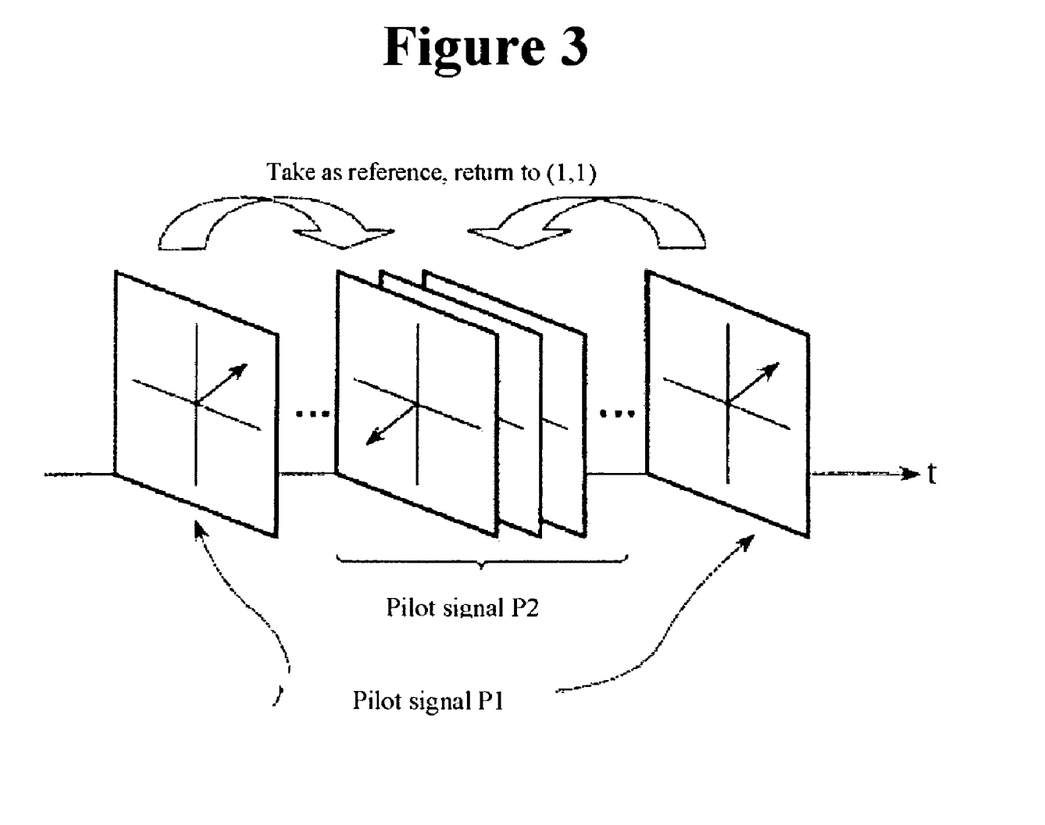
FIG. 3 is an explanatory diagram of first and second pilot signals on the receiver side.

In this way, PAPR suppression is done by transmitting a pilot signal in which a first pilot signal P1 and a second signal P2 are combined on the time axis (for example, combined without temporal overlap), and on the receiver side, as shown in FIG. 3, this pilot signal is set so as to be able to ignore the phase change of the second signal P2 received during the first pilot signal P1 of known pattern, and because the second pilot signal P2 is one of the four signal points (1,1), (1,−1), (−1,1), (−1,−1), processing can be done that returns it to known signal point (1,1) of the first pilot signal P1. Therefore processing as a pilot signal can be done in the same way as in the case in which an ordinary pilot signal undergoes reception processing.

In the aforesaid case, the second signal P2, for which the first pilot signal P1 is phase-rotated in 90-degree units so as to obtain a PAPR suppression effect in order to effect PAPR suppression, is set to a phase that corresponds to the calculation results in PAPR suppression signal calculation unit 4, but the transmission can be done with this second signal P2 phase-rotated in units of $\theta=360/n$ (where n is an integer greater than or equal to 2). For example, if we set n=2, then second signal P2 can be transmitted selected from the calculation results in PAPR suppression signal calculation unit 4 from the two choices 0 degrees and 180 degrees, and if we set n=4, it can be selected from the four phase rotations referred to above. In this case, the higher the value n is set to, the greater the number of choices that can be selected, so the PAPR suppression effect can be improved.

Figure 4:
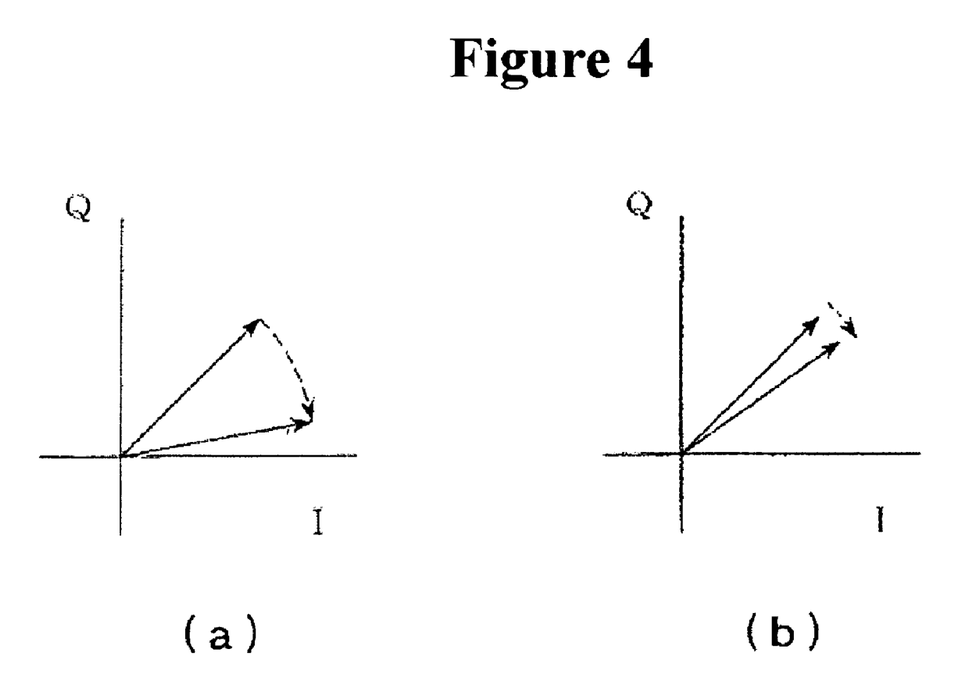
FIGS. 4(a) and 4(b) are explanatory diagrams of the phase change of the pilot signal.

FIGS. 4(a) and 4(b) are explanatory diagrams of the phase change; in 4(a), if the phase change is large as indicated by the dotted-line arrow, then if the selection phase $\theta$ of second signal P2 is made small and the number of choices is made large, then on the receiver side the phase change in the wireless propagation path and the selection phase of second signal P2 will come to approximate each other, and reception demodulation of second signal P2 may be difficult. In that case, the selection phase $\theta$ of second signal P2 is made large. That is, the n in $\theta=360/n$ is set to a small value. By this, reception demodulation of second signal P2 becomes easier. And as shown in FIG. 4(b), if the phase change is small as indicated by the dotted-line arrow, then even if the phase rotation $\theta$ is made small, that is, even if the n in the aforesaid $\theta=360/n$ is set to a large value, then reception demodulation of second pilot signal P2 will be easy, and because the selection of phases can be made finer, the PAPR suppression effect can be improved.

In FIG. 1, amplitude control (amplitude control unit not pictured) can be provided that controls the amplitude of first pilot signal P1, second signal P2, or both, according to the calculation results given by PAPR suppression signal calculation unit 4. For example, if the amplitude is to be controlled with respect to second signal P2, then on the receiver side the amplitude of second signal P2 can be corrected based on the reception demodulation results of first pilot signal P1. Also, both the phase and amplitude of second signal P2 can be controlled in correspondence with the calculation results given by PAPR suppression signal calculation unit 4. For the amplitude of first pilot signal P1 as well, PAPR suppression can be done by controlling it.

Figure 5:
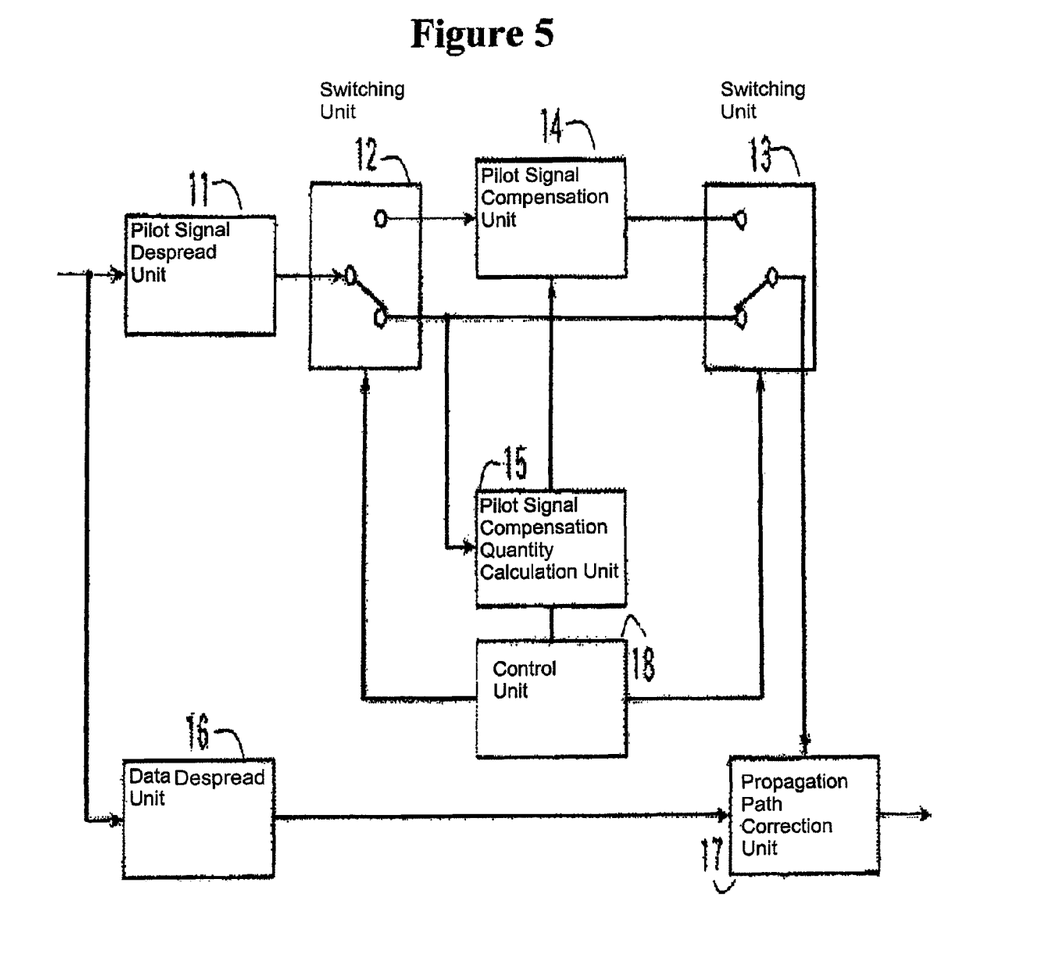
FIG. 5 is an explanatory diagram of the main parts of the reception unit of a wireless communication device.

In FIG. 5, which shows the composition of the main parts of the reception unit of a wireless communication device to which the CDM system is applied, 11 is a pilot signal despread unit, 12 and 13 are switching units, 14 is a pilot signal compensation unit, 15 is a pilot signal compensation quantity calculation unit, 16 is a data despread unit, 17 is a propagation path correction unit, and 18 is a control unit. Omitted from the diagram are the makeup of the reception antenna, demodulation unit, and other high-frequency processing parts and the processing units for reception data, etc.

By control unit 18, switching operations are carried out in such a way that during the reception time period of first pilot signal P1, switching units 12 and 13 are set to the switching state shown in the diagram, and during the reception time period of second signal P2, switching unit 12 is connected between pilot signal despread unit 11 and pilot signal compensation unit 14, and switching unit 13 is connected between pilot signal compensation unit 14 and propagation path correction unit 17. If a pilot signal pattern that shows the transmission time periods of the first and second pilot signals P1 and P2 is preset, the switching control of switching units 12 and 13 by this control unit 18 follows this pattern, and if it changes adaptively, switching control can be done in correspondence with the transmission time periods of first and second pilot signals P1 and P2 by receiving control information that indicates the pilot signal pattern.

Moreover, although there is no need to detect the reception time period of the first pilot signal, various methods can be applied. For example, a wireless communication device that transmits the first pilot signal can be detected by taking the signals of separate transmitting channels as distinguishing marks. For example, it can be arranged that the first pilot signal is transmitted from the time when a signal of a separate channel corresponds to a part that constitutes a specified signal pattern (the same timing as that part, or a time that is a prescribed time before or after that part), and by detection of the specified signal pattern on the receiver side, the start of the first pilot signal that is inserted periodically can be detected.

Also, if it is set up so that the first pilot signal is transmitted multiply and continuously, then by receiving the same signal multiple times in a row, it can be detected that it is the first pilot signal, and that the continuous time period is the transmission time period of the first pilot signal. At that time, in consideration of the fact that the second pilot signal also will be the same signal continuously, the transmission time period of the first pilot signal can be detected by the fact that the continuous time period appears repeatedly multiple times with a known periodicity. And if the first pilot signal is transmitted periodically, then if it can be detected for multiple periods that the same signal can be received periodically, it will be possible to detect the transmission time period of the first pilot signal.

The first pilot signal P1 and the second signal P2 undergo despread processing in pilot signal despread unit 11 according to the spread code assigned to the pilot signal, and by the switching state of switching units 12 and 13 that is pictured in the diagram, first pilot signal P1 is input into pilot signal compensation quantity calculation unit 15 and propagation path correction unit 17. And in the same way as in the case of an ordinary pilot signal, data that undergoes despread processing by data signal despread unit 16 is corrected in propagation path correction unit 17 and is transferred to a later-stage processing unit that is not pictured in the diagram.

In the time period that corresponds to the transmission time period of second signal P2, switching units 12 and 13 are switched from the state pictured in the diagram, second signal P2 is input into pilot signal compensation unit 14, in pilot signal compensation quantity calculation unit 15, compensation of the phase rotation, etc. corresponding to second signal P2 is done based on the compensation quantity for the phase rotation, etc. corresponding to second signal P2 for which the first pilot signal P1 is taken as the reference, and it is input into propagation path correction unit 17 as a pilot signal of the same known pattern as the first pilot signal. Therefore by taking second signal P2 as a pilot signal of the same known pattern as first pilot signal P1, correction of the propagation path properties can be done with respect to the data.

Figure 6:
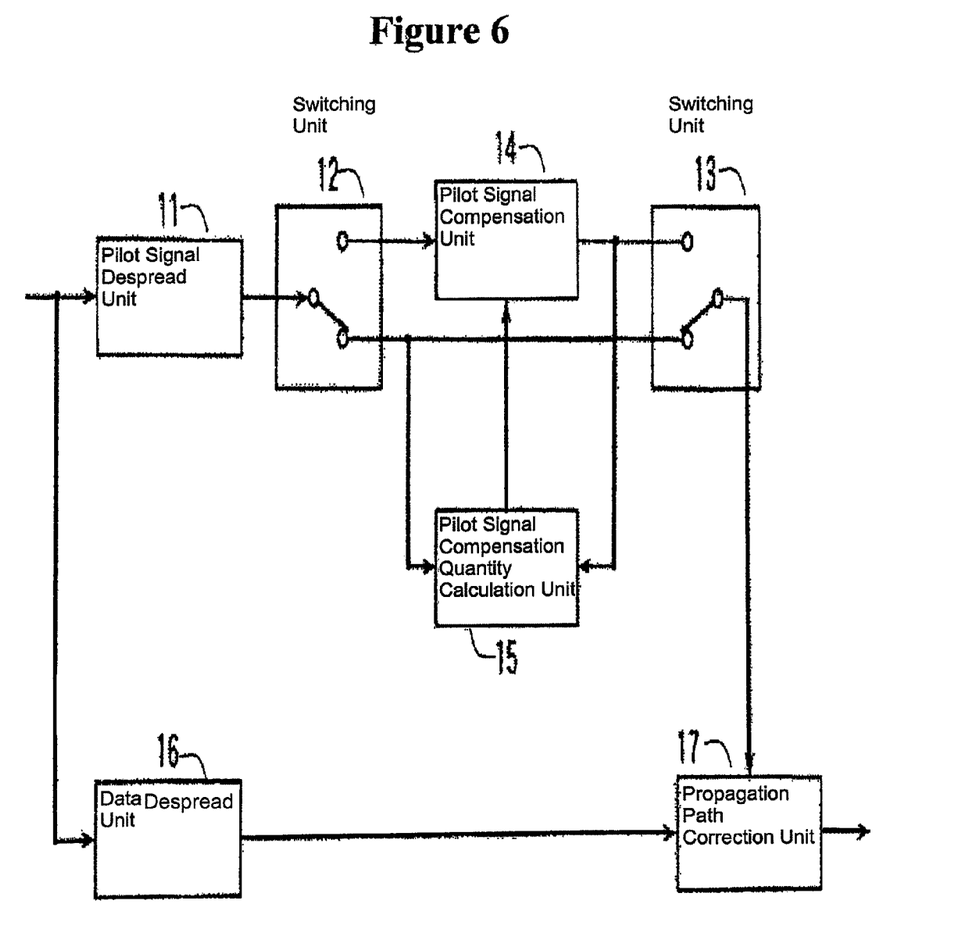
FIG. 6 is an explanatory diagram of the main parts of the reception unit of a wireless communication device.

FIG. 6 shows the configuration of the principal parts of the reception unit of a wireless communication device to which is applied a CDM system in which part of the configuration shown in FIG. 5 has been modified; the same symbols as in FIG. 5 denote the same named parts. Moreover, control unit 18 has been omitted from the diagram. Also, in the configuration shown in FIG. 5, the case is shown in which first pilot signal P1 is used and then compensation of second signal P2 is done, but in FIG. 6 it has a configuration in which second signal P2 compensated by pilot signal compensation unit 14 is also input into pilot signal compensation quantity calculation unit 15, and compensation of second signal P2 is done.

Figure 7:
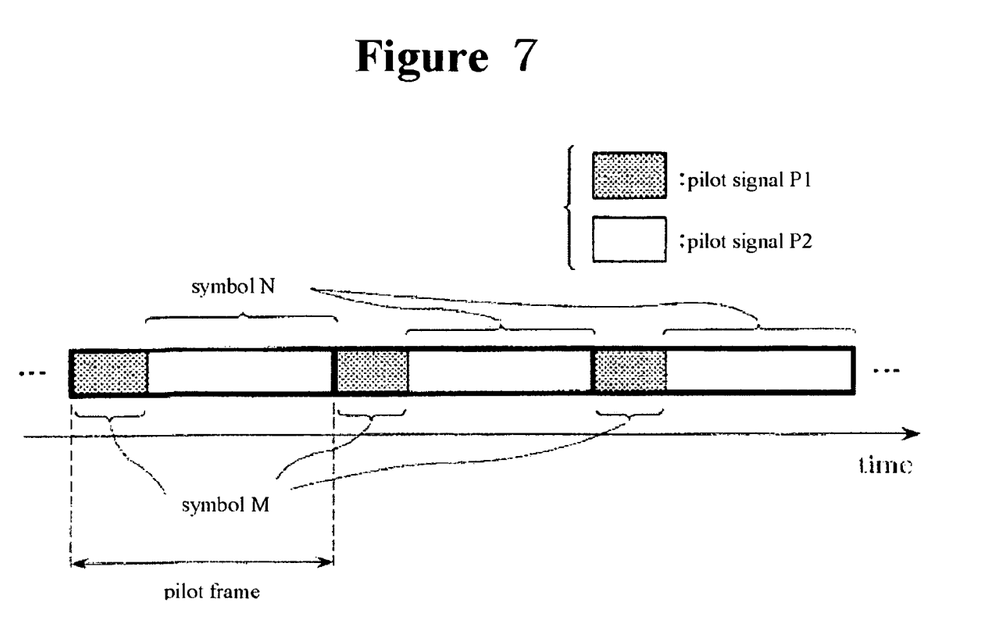
FIG. 7 is an explanatory diagram of the pattern of the first and second pilot signals.

FIG. 7 is an explanatory diagram for the transmission ratio of first pilot signal P1 and second signal P2; taking symbol M of first pilot signal P1 and symbol N of second signal P2 as pilot frames, these pilot frames can be transmitted repeatedly. As stated above, the length of the pilot frame in this case can also be set to a time period that is long enough so that the phase change in the transmission time period of second signal P2 during first pilot signal P1 can be ignored. Also, it is usual to set the ratio M/N of first pilot signal P1 and second signal P2 to a preset value, but this could also be varied based on the state of the wireless propagation path, etc.

Figure 8:
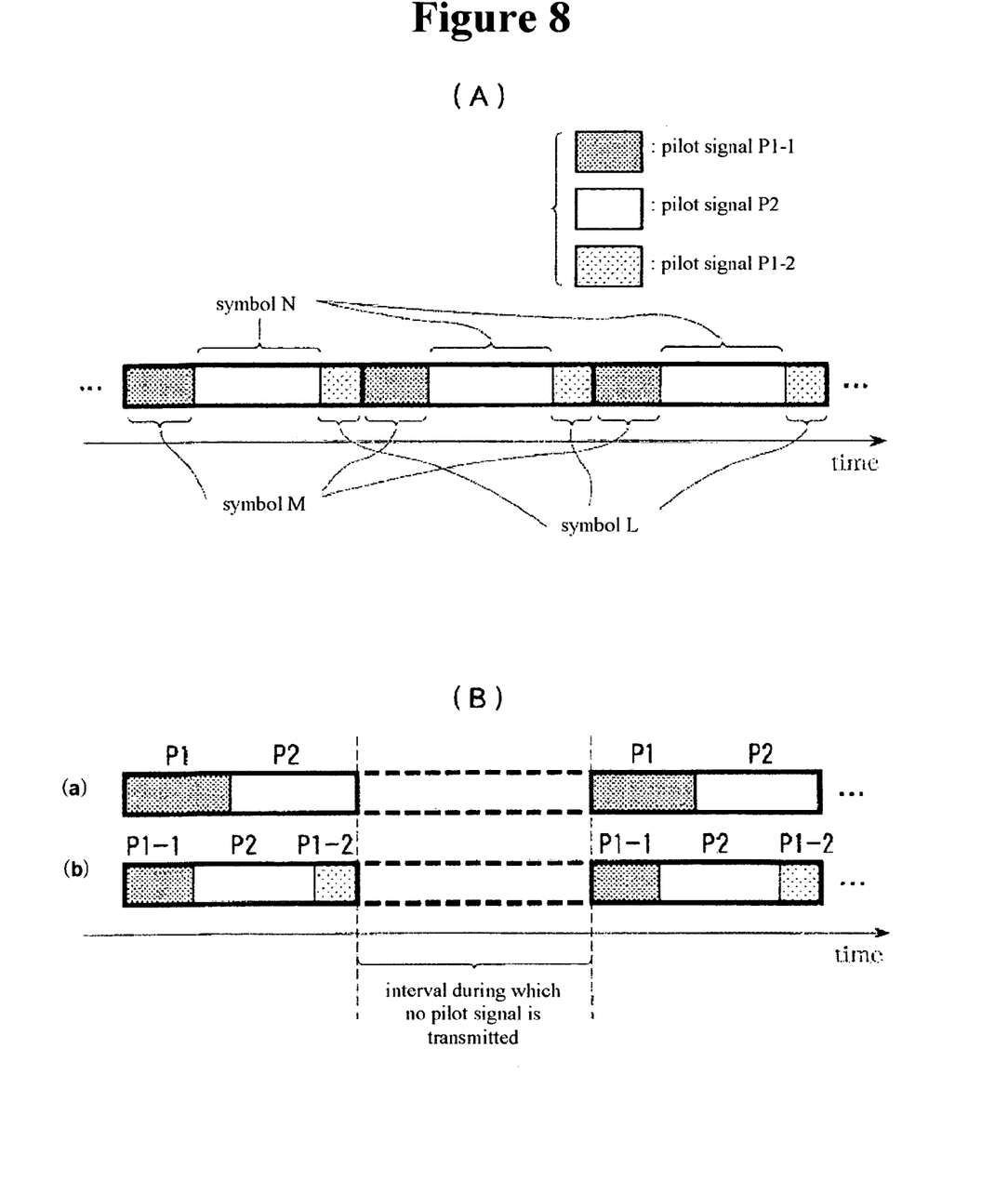
FIGS. 8(A) and 8(B) are explanatory diagrams of the pattern of the first and second pilot signals.

FIG. 8 (A) shows the case in which a pilot signal is used in which, within one pilot frame, first pilot signal P1-1 is arranged as symbol M, then second signal P2 is arranged as symbol N, then first pilot signal P1-2 is arranged as symbol L; their ratio M/N/L can be set to a preset value. Also, as stated above, the interval between first pilot signals P1-1 and P1-2 can be set to a time period whereby the phase change can be ignored.

In FIG. 8(B), (a) and (b) are an explanatory diagram for the case in which there is an interval in which no pilot signal is transmitted; (a) shows the case in which the pilot signal pattern shown in FIG. 7 is used, and (b) shows the case in which the pilot signal pattern shown in FIG. 8 (A) are used. If the phase change in the interval during which no pilot signal is transmitted is large, in the case of the pilot signal pattern shown in (a), the end of the interval during which there is no transmission is second signal P2, and in the case of the pilot signal pattern shown in (b) it is first pilot signal P1-2, so the demodulation processing of second signal P2 in the reception-side demodulation of the pilot signal has the advantage of having better demodulation precision than the case shown in (a).

Figure 9:
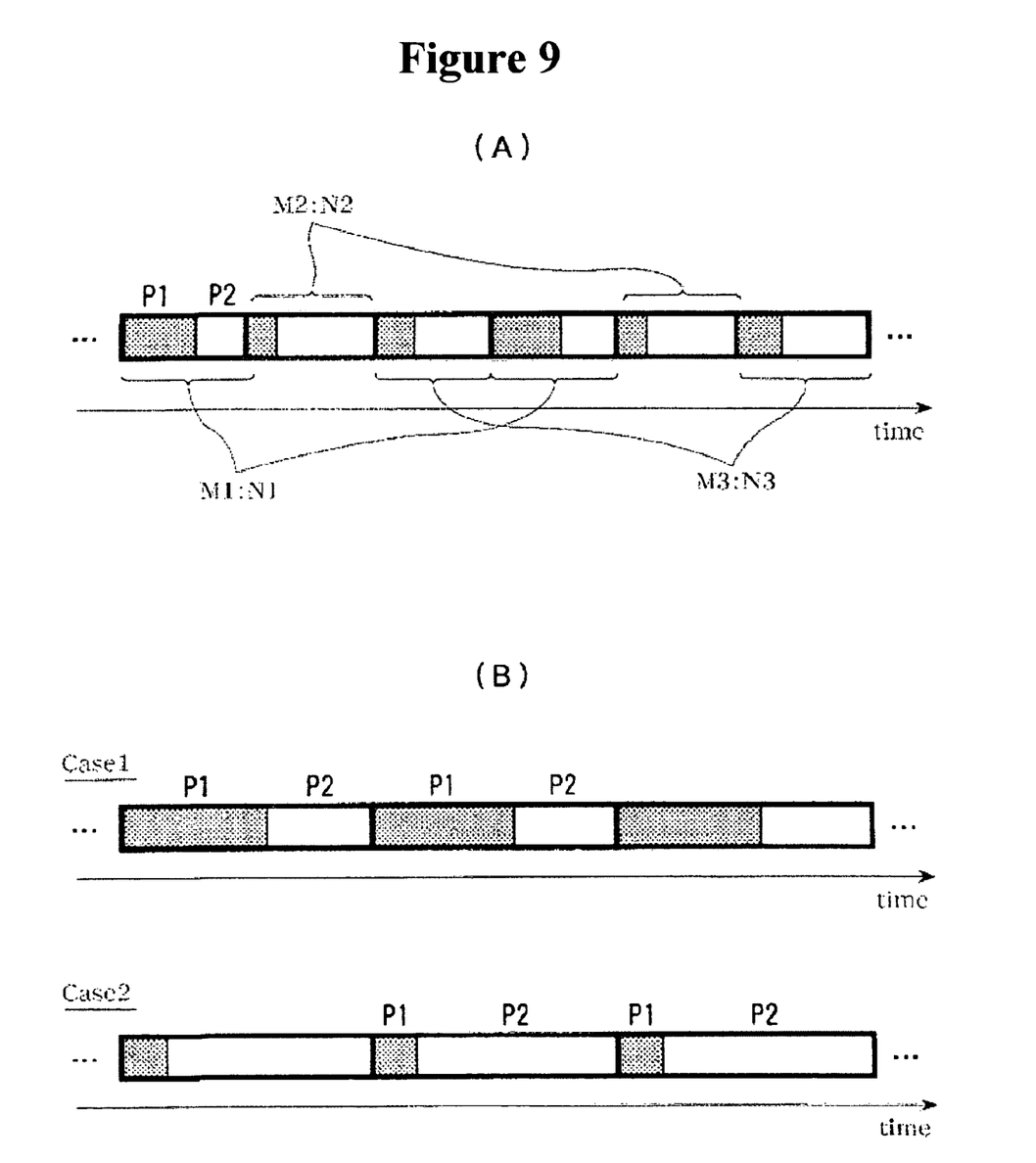
FIGS. 9(A) and 9(B) are explanatory diagrams of the pattern of the first and second pilot signals.

FIG. 9 (A) shows the case in which pilot signals are repeatedly transmitted in a pattern where the ratio between first pilot signal P1 and second pilot signal P2 changes as M1:N1, M2:N2, M3:N3. If pilot signals are transmitted by a pattern in which the ratio is changed with each pilot frame in this way, it can be done by controlling switching unit 8 by control unit 9 in FIG. 1. If such switching control is applied to, for example, a wireless communication system that performs synchronization using pilot signals, then by using a pilot frame in which first pilot signal P1 has a high ratio, the receiver side can perform synchronization with greater precision than if a pilot frame of another ratio were used.

FIG. 9(B) shows as Case1 and Case2, the ratio of first pilot signal P1 and second signal P2 in the pilot frames is made different, and which of Case1 and Case2 to adopt can be changed adaptively. For example, when it is determined in PAPR suppression signal calculation unit 4 (see FIG. 1) that the PAPR is large, or when there are many spread codes in the CDM system, then Case2 is selected, which includes many second signals P2 for carrying out PAPR suppression, and when it is determined that the PAPR is small, or when there are few spread codes in the CDM system, then Case1 is selected, which includes many first pilot signals P1, and in order to notify the receiver side of this pilot signal pattern, notice is given to the receiver side by control information, for example setting Case1=0, Case2=1 by a one-bit configuration. Moreover, if a selection is to be made from among a larger variety of pilot signal patterns by the two types Case1 and Case2, the receiver side can be given notice of the pilot signal pattern by a number of bits that corresponds to the number of types. This amounts to, for example, doing switching control of switching units 12 and 13 by reception-side control unit 18 shown in FIG. 5.

Figure 10:
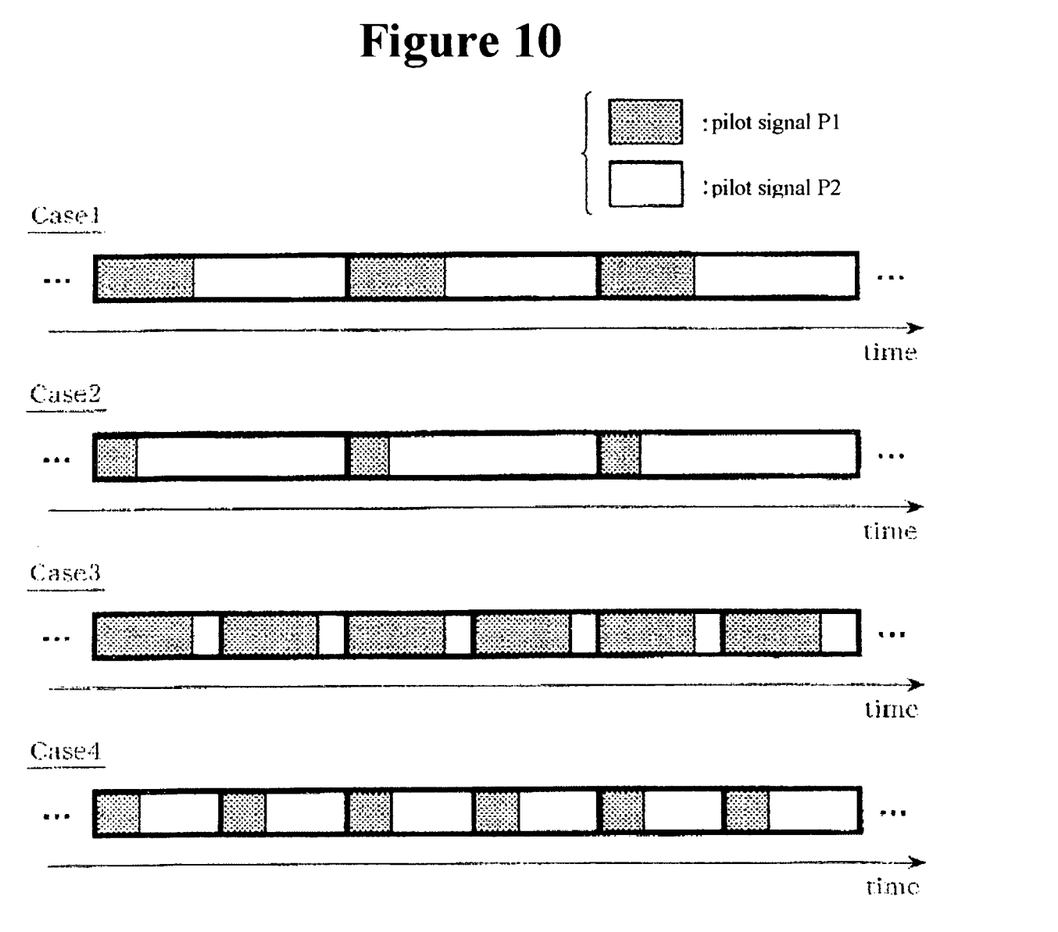
FIG. 10 is an explanatory diagram of the pattern of the first and second pilot signals.

FIG. 10 shows cases in which the pilot frame is not fixed but is variable; Case1 and Case2 depict the case in which the length of the pilot frame is the same and the ratio of first pilot signal P1 and second signal P2 is different, while Case3 and Case4 depict the case in which the length of the pilot frame is shorter than in Case1 and Case 2. The selection from among Case1 to Case4 can be made according to the following conditions.

Case1: if it is anticipated that the phase change in the wireless propagation path is small and the PAPR is small;

Case2: if it is anticipated that the phase change in the wireless propagation path is small and the PAPR is large;
Case3: if it is anticipated that the phase change in the wireless propagation path is large and the PAPR is small;
Case4: if it is anticipated that the phase change in the wireless propagation path is large and the PAPR is large.

That is, if the phase change of the communication path that includes the wireless propagation path is large, the precision of the pilot demodulation signal on the receiver side can be improved by making the pilot frame smaller. If the pilot signal pattern is varied adaptively in this way, by notifying the receiver side of the control information, it is possible on the receiver side to do reception processing on the first and second pilot signals P1 and P2 and return the second signal P2 to first pilot signal P1.

Figure 11:
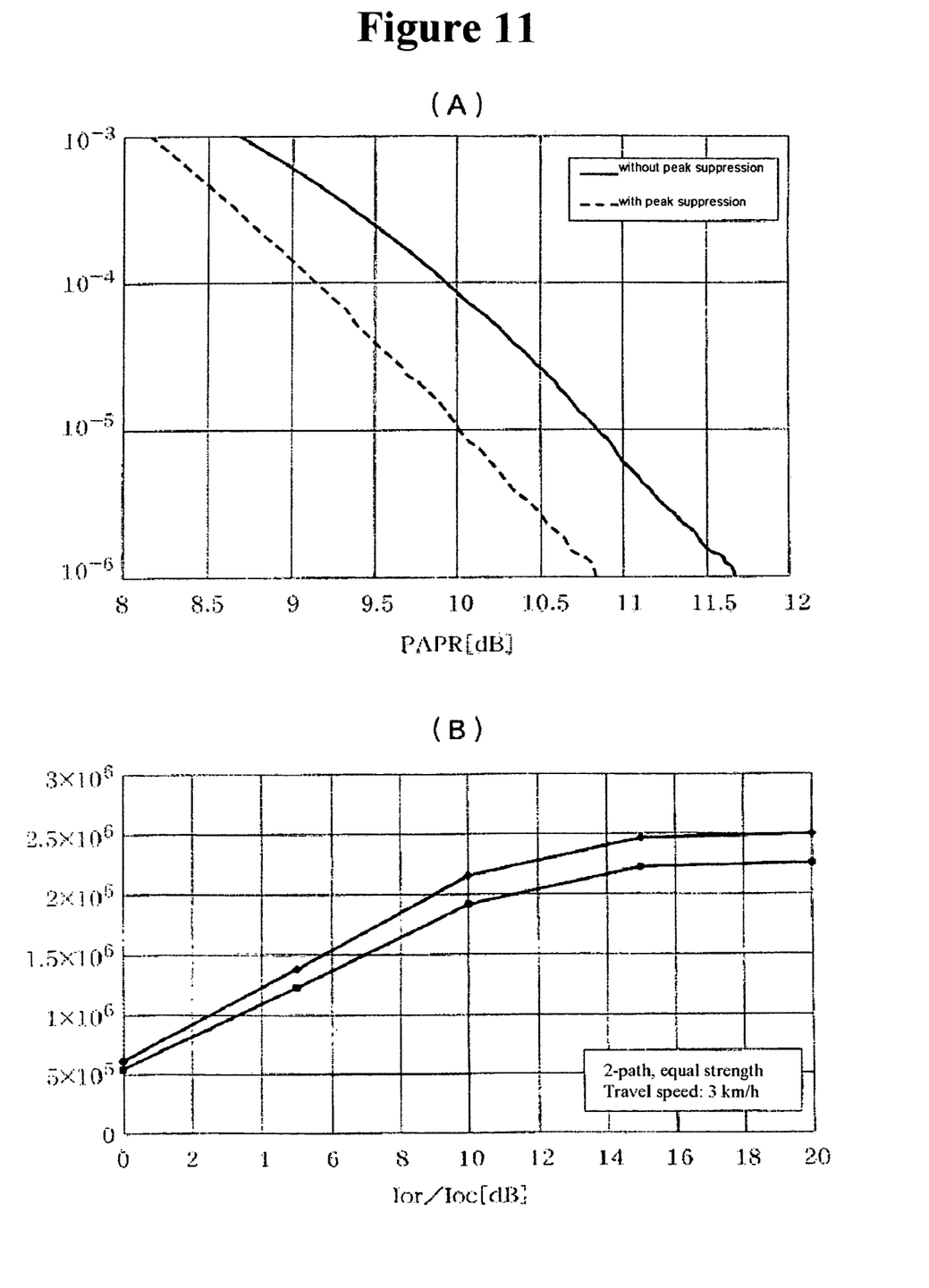
FIGS. 11(A) and 11(B) are explanatory diagrams of the effects of a simulation.

FIG. 11 (A) shows the results of a simulation of the peak suppression effect, and FIG. 11(B) shows the results of a simulation of a conventional example and of this invention. FIG. 11 (A) shows the PAPR suppression effect if one applies high-speed downlink packet access (HSPDA) for speeding up the transmission rate of the downlink in the wideband-code division multiple access (W-CDMA) system; it shows the results of a computer simulation, given that the transmission signal is set to 24-code multiplex, the pilot channel for peak power suppression is set to a common pilot channel (CPICH), and the ratio of the CPICH power to the total transmission power is set to 0.1. The peak to average power ratio (PAPR) is plotted along the horizontal axis, and the cumulative probability is plotted along the vertical axis. "With peak suppression" in the diagram is the result if the ratio of the first pilot signal P1 to second signal P2 in this invention is set to 1:9. It is seen that there is a peak suppression effect of about 0.8 dB at a cumulative probability of $10^{-4}$.

FIG. 11 (B), like in FIG. 11(A), shows the results of a simulation if HSPDA is applied and the travel speed of the mobile wireless communication device is set to 3 km/h; Ior/Ioc (the ratio of own-cell power to multi-cell power on the receiver side) is plotted along the horizontal axis, and the throughput of the high-speed downlink shared channel (HS-DSCH) is plotted along the vertical axis. In this invention, because peak suppression is done using a pilot signal by CPICH, there is no need to set up a new channel for peak suppression as in a conventional example, so the HS-DSCH power can be allocated just for the portion of the channel for peak suppression of the conventional example. As a result, it is clear that in this invention the signal-to-interference ratio (SIR) of the HS-DSCH is greater, and the throughput is better, than in the conventional example. By changing from the PAPR suppression means of the conventional example to the PAPR suppression means of this invention, the rate of throughput increase becomes about 10% in the region where or/Ioc=15 dB or less.

For the known signals referred to above, the explanation has dealt mainly with the case in which a pilot signal is used in the CDM system, but a pilot signal and other known signals in a multiplexing transmission system such as the OFDM system can be transmitted as a first known signal and a second signal that controls the phase or amplitude or both so as to perform PAPR suppression.

Also, it is a concept of whether a channel is the same or different, but if the transmission frequency and spread code are the same, it can be deemed to be the same channel, even if the transmission times are different.

That is, for example, in FIG. 1, although the transmission part of P1 and the transmission part of P2 differ temporally, their transmission frequency and spread code are the same, and both P1 and P2 can be deemed to be being transmitted on the same channel (pilot channel).

This invention provides advantages because it transmits together on the time axis known signals and signals that are processed with respect to the known signals so as to be able to suppress the peak to average power ratio. Also, it makes use of part of a channel that transmits known signals, with this invention it is unnecessary to newly introduce a special channel for peak suppression. There is no need to newly allocate for suppression purposes any frequency that is different from the channel that transmits known signals, or any different spread code.

What is claimed is:

1. A wireless communication apparatus, comprising:
   a multiplex unit multiplexing a processed signal with a data signal; and
   a transmitter transmitting the multiplexed signal from the multiplex unit,
   wherein the processed signal shares a time domain with a first known signal and a second known signal, the first known signal for not suppressing a peak power to an average power ratio and the second known signal for suppressing a peak power to an average power ratio.

2. The wireless communication apparatus of claim 1, wherein the second known signal is rotated by a signal phase.

3. The wireless communication apparatus of claim 1, wherein the second known signal is changed by a signal amplitude.

4. The wireless communication apparatus of claim 1, wherein the second known signal is changed by a signal amplitude and a signal phase.

5. The wireless communication apparatus of claim 1, wherein the data signal includes a plurality of data signals.

6. The wireless communication apparatus of claim 1, wherein the data signal includes a plurality of data signals, and
   the second known signal is signal phase rotated.

7. The wireless communication apparatus of claim 1, wherein the data signal includes a plurality of data signals, and
   the second known signal is changed a signal amplitude and a signal phase.

8. The wireless communication apparatus of claim 1, wherein the data signal includes a plurality of data signals, and
   the second known signal change a signal amplitude and a signal phase.

9. A wireless communication apparatus, comprising:
   a multiplex unit multiplexing a processed signal with a data signal;
   a transmitter transmitting the multiplexed signal from the multiplex unit; and
   a receiver receiving the transmitted multiplexed signal and restoring the received signal to an original state of a second known signal in accordance with a first known signal,
   wherein the processed signal shares a time domain with the first known signal and the second known signal, the first known signal for not suppressing a peak power to an average power ratio and the second known signal for suppressing a peak power to an average power ratio.

10. The wireless communication apparatus of claim 9, further comprising:
    a calculator calculating a result to determine the compensation for the second known signal in accordance with the data signal.

11. The wireless communication apparatus of claim 9, further comprising;
   a switch receiving the transmitted multiplexed signal and switching the received signal in accordance with a controller.

12. A wireless communication apparatus, comprising:
   a reverse spread unit receiving a transmitted signal which includes a data signal and a processed signal that shares time domain with a first known signal and a second known signal, the first known signal for not suppressing a peak power to an average power ratio and the second known signal for suppressing a peak power to an average power ratio; and
   a calculator calculating to compensate the second known signal in accordance with the first known signal.

13. A method for a wireless communication apparatus, said method comprising:
   multiplexing a processed signal with a data signal; and
   transmitting the multiplexed signal,
   wherein the processed signal shares a time domain with a first known signal and a second known signal, the first known signal for not suppressing a peak power to an average power ratio and the second known signal for suppressing a peak power to an average power ratio.

14. A method for a wireless communication apparatus, said method comprising:
   multiplexing a processed signal with a data signal;
   transmitting the multiplexed signal; and
   receiving the transmitted multiplexed signal and restoring the received signal to an original state of a second known signal in accordance with a first known signal,
   wherein the processed signal shares a time domain with the first known signal and the second known signal, the first known signal for not suppressing a peak power to an average power ratio and the second known signal for suppressing a peak power to an average power ratio.

15. A method for a wireless communication apparatus, said method comprising:
   receiving a transmitted signal which includes a data signal and a processed signal that shares time domain with a first known signal and a second known signal, the first known signal for not suppressing a peak power to an average power ratio and the second known signal for suppressing a peak power to an average power ratio; and
   calculating to compensate the second known signal in accordance with the first known signal.

\* \* \* \* \*